United States Patent [19]

Bennett et al.

[11] Patent Number: 4,844,385
[45] Date of Patent: Jul. 4, 1989

[54] PNEUMATIC AERODYNAMIC CONTROL SURFACE

[75] Inventors: John A. Bennett; Robert J. Englar; Andrew S. W. Thomas, all of Marietta, Ga.

[73] Assignee: Lockheed Corporation, Calabasas, Calif.

[21] Appl. No.: 33,976

[22] Filed: Apr. 3, 1987

[51] Int. Cl.⁴ .............................................. B64C 21/04
[52] U.S. Cl. .................................................. 244/207
[58] Field of Search ......................................... 244/207

[56] References Cited

U.S. PATENT DOCUMENTS

| | | | |
|---|---|---|---|
| 2,891,740 | 6/1959 | Campbell | 244/207 |
| 3,584,811 | 6/1971 | Leavy | 244/207 |
| 3,604,661 | 9/1971 | Mayer, Jr. | 244/207 |
| 3,606,213 | 9/1971 | Lubimov | 244/207 |
| 3,940,092 | 2/1976 | Farris | 244/207 |
| 4,019,696 | 4/1977 | Hirt et al. | 244/207 |
| 4,200,252 | 4/1980 | Logan et al. | 244/207 |

Primary Examiner—Galen Barefoot
Assistant Examiner—Rodney Corl
Attorney, Agent, or Firm—Robert P. Barton; Eric R. Katz

[57] ABSTRACT

A pneumatic aerodynamic control surface is described for an aircraft having a region of upwash ahead of a powered-lift or high-lift wing, the control surface comprising blown engine nacelles immersed in the upwash region, and capable of generating moments about all three axes of the aircraft without any external moving parts.

16 Claims, 2 Drawing Sheets

PNEUMATIC AERODYNAMIC CONTROL SURFACE

TECHNICAL FIELD

The present invention generally relates to powered control surfaces for maintaining flight control at low speeds and, more particularly, to a pneumatic aerodynamic control surface employing tangential blowing on an existing circular or near-circular vehicle component to furnish a no-moving-part aerodynamic control surface.

BACKGROUND ART

Recently developed powered-lift systems have shown significant potential to permit future aircraft, utilizing such systems, to operate from much smaller, isolated airfields, or conversely, to operate from existing fields with greatly increased payloads. Powered-lift systems commonly employ the jet exhaust from the engines of the aircraft in combination with a flap system on the wing to divert the engine exhaust downwards and thus increase lift.

One method of achieving this result is by blowing the jet exhaust over the upper surface of the wing, and utilizing downwardly extending trailing edge flaps to divert the exhaust, employing the well known Coanda effect. Such a powered-lift arrangement is commonly known as Upper Surface Blowing (USB), one such aircraft being described in U.S. Pat. No. 3,977,630 to Lewis et al. In USB, the engines are typically mounted on top of the wing with the engine nacelles extending forward of the leading edge of the lifting wing.

Over the Wing (OTW) blowing, another method for facilitating powered-lift, locates the engines, using pylons or the like, sufficiently above the wing so that the exhaust stream and wing surface do not interact. During powered-lift operation, a deflection hood, mounted on the upper perimeter of the engine exit, is rotated downward to deflect the thrust onto the aerodynamic high-lift system. As with USB, OTW locates the engine above the wing, with the engine nacelles being positioned forward of the leading edge of the wing.

Yet another powered-lift configuration is the Externally Blown Flap (EBF) wherein, in one embodiment, a portion of the efflux from the fan section of the jet engine passes under the wing. A trailing edge flap, often slotted, is utilized to direct the jet flow downwards during powered-lift operation. One such aircraft is disclosed by U.S. Pat. No. 3,614,028 to Klechner. In the EBF configuration, the engines are typically attached to the undersurface of the wing with the engine nacelles extending forward of the leading edge of the lifting wing.

In each of the powered-lift arrangements discussed above, a characteristic flowfield is generated. This flowfield is characterized by a region of upwash, at a relatively large angle, ahead of the lifting wing.

The high-lift coefficients provided by these advanced powered-lift systems are capable of producing flight speeds so low that conventional aerodynamic control surfaces cannot guide and stabilize the aircraft. Further, these powered-lift systems inherently cause nose-down pitching moments during operation. To trim these moments, the conventional approach has been an aft-mounted horizontal stabilizer which is loaded with a down force, i.e. negative lift, which produces nose-up pitch but reduces total aircraft lift available. However, at the slow flight speeds now obtainable, the dynamic pressure producing the tail down-load to trim has also been reduced while the wing pitching moment has become much larger. Thus, the trim problem has increased, for the ability of the tail to solve it has decreased. The required tail area to trim these moments has grown to the point of being unacceptable from a cruise drag, complexity, and weight standpoint.

DISCLOSURE OF THE INVENTION

Accordingly, it is an object of the present invention to provide an aerodynamic control surface for furnishing aerodynamic force and moment during generation at low airspeeds while causing no detriment to the aircraft's cruise performance.

It is another object of the present invention to provide an aerodynamic control surface which, at slow airspeed, is a pitch-up, yaw, and roll moment generator that eliminates the need for the mechanical deflection of a control surface or element.

It is yet another object of the present invention to employ tangential blowing on an existing circular or near-circular vehicle component, such as, for example, the nacelle of an engine which is immersed in the upwash of fluid during powered-lift operation, to furnish a no-moving-part aerodynamic control surface.

One advantage of the present invention is that it is not limited in performance to a single-point design because control surface flow rate variations adjust the performance to the required need.

Another advantage of the present invention is that it utilizes components of the aircraft that are normally only wetted surfaces producing parasitic drag and employs these surfaces as aerodynamic control surfaces to augment conventional control surfaces, thus eliminating the need for oversized conventional control surfaces.

Yet another advantage of the present invention is the essential elimination of moving parts, thus reducing weight, and providing simplicity as well as reliability in operation.

Yet another advantage is the ability of this control surface when operated in pairs where the flow rates between the two may be differentially controlled, to provide all three control moments (pitch, roll and yaw) from a single type of control surface.

In accordance with these and other objects, advantages and features of the present invention there is provided an aerodynamic control surface of a powered-lift or conventional high-lift aircraft having a region of upwash fluid flow ahead of a lifting wing during powered-lift or high-lift operation and a near circular aircraft component having a surface immersed in and wetted by the upwash of fluid flow. The aerodynamic control surface comprises a source of compressed fluid, a fluid discharge slot extending longitudinally along at least one side of the aircraft component for discharging the compressed fluid as a thin jet sheet substantially tangentially to the upwash fluid flow ahead of the lifting wing created during powered-lift operation, and a mass flow control means for controlling and regulating the compressed fluid issued from the slot so that the thin jet sheet remains attached to the component surface and energizes the boundary layer adjacent the component surface, as well as entraining the local upwash fluid flow thereby increasing fluid flow circulation over the blown component surface and creating an aerodynamic force.

Further, in accordance with the present invention, the near-circular aircraft component has a thickness-to-chord ratio of approximately 1.0 with the chord length being substantially parallel to the upwash fluid flow and the fluid discharge slot being positioned between approximately the 45% to 90% chord length from the effective leading edge of the near-circular aircraft component.

Additionally, the fluid discharge slot comprises a slot lip forming the upstream portion of the slot and a turning surface forming the downstream portion of the slot so that the slot lip and turning surface form a convergent nozzle with the slot lip forming a portion of the wetted surface of the near-circular aircraft component and the turning surface being curved so that discharged fluid becomes attached thereto and is discharged from the slot substantially tangentially to the upwash fluid flow.

In accordance with the present invention, the near-circular aircraft component comprises an engine nacelle of an Over-the-Wing, Upper Surface Blowing and Externally Blown Flap powered-lift aircraft.

BEST MODE FOR CARRYING OUT THE INVENTION

Figure 1:
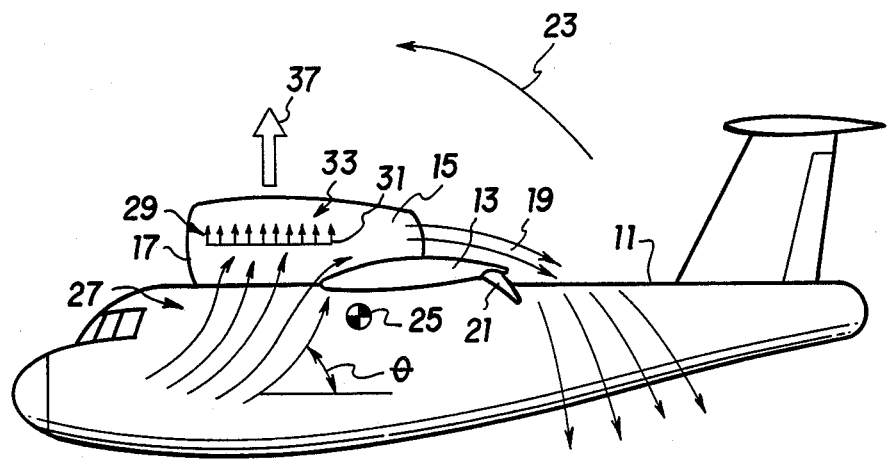
FIG. 1 is a side-view of a generic, high lift aircraft having the pneumatic aerodynamic control surface of the present invention.

Referring to FIG. 1, a generic powered-lift aircraft 11 is illustrated having a powered-lift wing 13 to which at least one engine 15, such as, for example, a turbofan or turbojet engine, is attached such that engine nacelle 17, a near-circular aircraft component, extends forward of the wing 13. The powered-lift aircraft 11 is representative of USB, OTW, and EBF powered-lift aircraft, which typically have at least one engine 15 on each wing 13.

During powered-lift operation, the jet thrust stream 19 from engine 15 is deflected at the flap 21 so that the aft portion of the wing 13 is loaded resulting in a nose-down pitching moment 23 about center of gravity 25. Additionally, a region of fluid upwash, generally indicated at 27, having a large upwash angle θ is created during the operation of the powered-lift system at an angle of attack. The present invention takes advantage of the upwash of fluid in a unique and novel manner as will be explained in further detail hereinafter.

Figure 2:
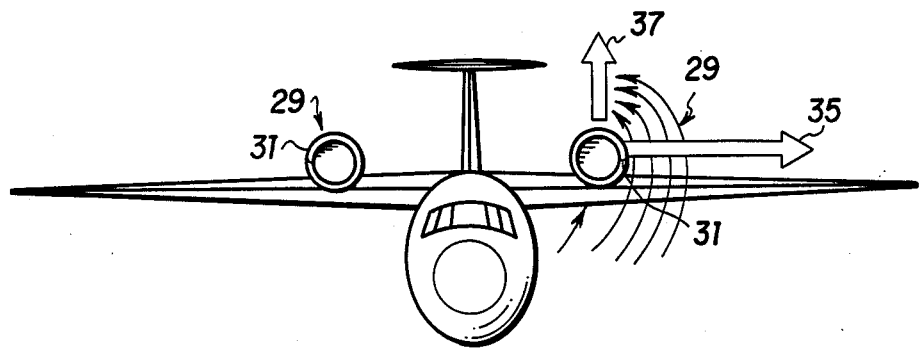
FIG. 2 is front-view of the generic, high lift aircraft of FIG. 1 and illustrates the aerodynamic forces provided by the control surface of the present invention.

The pneumatic aerodynamic control surface of the present invention, generally indicated at 29 in FIGS. 1 and 2, converts the near-circular engine nacelle 17 to a blown configuration by adding a fluid discharge slot 31 running longitudinally along at least one side of at least one nacelle 17 on each wing 13. The fluid discharge slot 31, as will be explained in further detail hereinafter, issues a thin jet sheet, generally seen at 33, which remains attached to the curved surface of the nacelle 17 by the now well-known Coanda effect. As the jet sheet 33 traverses the surface of nacelle 17, the boundary layer adjacent the nacelle surface is energized and local upwash fluid flow is entrained thereby increasing fluid flow circulation over the blown surface of the nacelle 17. Thus, by blowing the nacelle surface with the thin jet sheet 33, the nacelle 17, normally only a wetted surface producing parasitic drag, is converted to an airfoil adapted to obtain reaction from the upwash fluid flow in which the nacelle 17 is immersed during operation of the powered-lift wing 13.

Referring to FIG. 2, the relative normal force 35, produced by the converted engine nacelle 17, and the drag 37 on the nacelle 17, are experienced by the aircraft 11 as side force and positive lift, respectively, which result in yawing and pitch-up moments on the aircraft 11. When nacelles 17 on both sides of the lifting wing 13 are blown simultaneously, the yawing moments cancel and a net nose-up pitching moment results to counteract the nose-down pitching moment of the powered-lift wing 13. If at least one nacelle 17, on a single side of the wing 13, is blown, then a side force and rolling and/or yawing moments result. Further, with fluid discharge slots 31 positioned on each side of a nacelle 17, when each slot 31 is blown simultaneously, the side forces cancel and a net pitch-up moment is produced.

Figure 3:
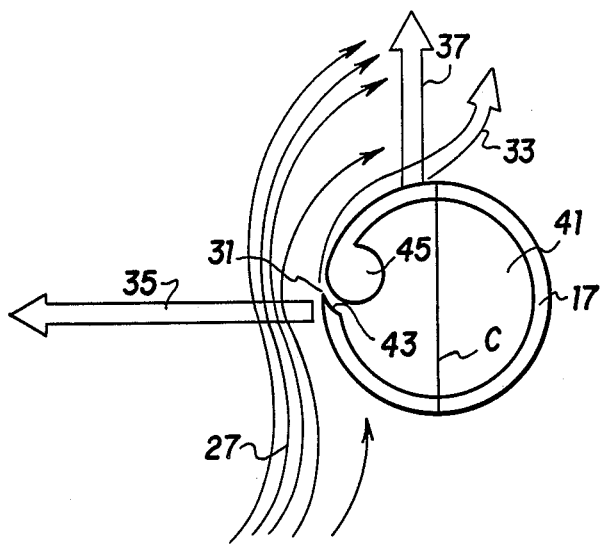
FIG. 3 schematically illustrates, in section, the pneumatic, aerodynamic control surface of the present invention.
Figure 4:
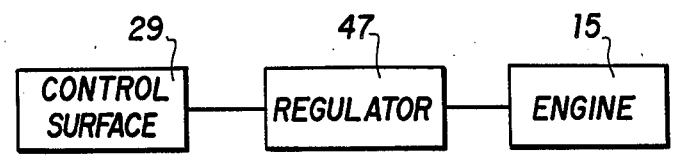
FIG. 4 is a schematic illustration of the control arrangement for the control surface of the present invention.

Referring to FIG. 3, the pneumatic aerodynamic control surface 29 is illustrated schematically and in section to explain the operation thereof. The control surface 29 is a blown surface intended to take advantage of the very high aerodynamic forces which are available when jet sheet 33 is blown substantially tangentially to the upwash fluid flow from the side of the engine nacelle 17. The present invention utilizes the near circular nacelle 17 as an airfoil having a thickness-to-chord ratio of approximately 1.0, which is optimum for high lift generation at minimum blowing rates. With chord C of the near-circular nacelle 17 positioned substantially parallel to the upwash fluid flow 27 as shown, the high drag 37 experienced by the nacelle 17 is actually experienced as lift by the aircraft 11 thereby providing a pitch-up moment.

The slot 31 is located on the side surface of the nacelle 17 relative to the upwash of fluid flow approximately between the 45% and 90% chord length and provides a smooth exit sheet for the tangential jet sheet 33 formed by the escape of compressed or pressurized fluid from plenum 41. The compressed fluid is supplied from a source of compressed fluid, typically, engine bleed air ports for turbojet engines or pick-ups in the bypass channel for turbofan engines. The compressed fluid may also be supplied by an auxiliary power unit.

The fluid discharge slot 31 comprises a slot lip 43 which forms the upstream as well as outer portion of the slot 31 and a turning surface 45 which forms the inner as well as downstream portion of slot 31. Preferably the slot lip 43 forms a portion of the wetted surface of the nacelle 17 and additionally, has a reduced thickness near the downstream edge thereof as seen in FIG. 3. The turning surface 45 is provided with a curved contour to form a smoothly convergent nozzle such that discharged compressed fluid becomes attached to the turning surface 45 and is discharged substantially tangentially to the upwash of fluid flow in the location of the discharge slot 31.

There are no internal or external moving parts save for an appropriate internal pressure regulator or mass flow control means 47 for each control surface which allows the pilot to regulate the amount of blowing for the slot 31 and thus the resultant forces generated by the control surface 29.

While the invention has been particularly shown and described with respect to preferred embodiments thereof, it will be understood by those skilled in the art that various alterations in form and detail will be made therein without departing from the spirit and scope of the attached claims.

We claim:

1. In combination with an STOL aircraft having a highlift wing attached to a fuselage and at least one near circular aircraft component positioned on the aircraft ahead of its center of gravity such that at least a portion of each side surface of the near circular aircraft component is immersed in and wetted by the large upwash of fluid flow ahead of the lifting wing created during STOL operation of the aircraft, and aerodynamic control surface comprising:
    (a) a source of compressed fluid;
    (b) at least one fluid discharge slot on each wetted side surface of the near circular aircraft component for discharging the compressed fluid substantially in the direction of local fluid flow and tangentially to the upwash of fluid flow in the vicinity of said fluid discharge slot;
    (c) a mass flow control means for controlling the flow rate of the fluid discharged from said fluid discharge slots; and
    (d) a fluid flow selection means for selectively operating each fluid discharge slot independently of the other.

2. The combination of claim 1, wherein said near-circular aircraft component has a thickness-to-chord ratio of approximately 1.0 with said chord being substantially parallel to the upwash fluid flow.

3. The combination of claim 2, wherein each slot is positioned between approximately 45% and 90% chord length of said near-circular aircraft component.

4. The combination of claim 3, wherein said fluid discharge slot comprises;
    (a) a slot lip which forms the upstream portion of said slot; and
    (b) a turning surface which forms the downstream portion of said slot; whereby said slot lip and turning surface form a smoothly convergent nozzle, which exits substantially parallel to the upwash flow field.

5. The combination of claim 4, wherein said slot lip forms a portion of the wetted surface of said near-circular aircraft component and has a reduced thickness near the downstream edge thereof.

6. The combination of claim 5, wherein said turning surface is curved such that the discharged compressed fluid becomes attached thereto and is discharged from said fluid discharge slot substantially tangentially to the upwash of fluid flow.

7. The combination of claim 6, wherein said circular aircraft component is an engine nacelle.

8. The combination of claim 7, wherein at least one engine nacelle is positioned on the lifting wing on each side of the fuselage.

9. The combination of claim 8, wherein said fluid discharge slot is positioned along the outboard side of each engine nacelle, or additionally, along the inboard side for additional control power.

10. The combination of claim 9, wherein said source of compressed fluid is bypass flow from a turbofan engine.

11. The combination of claim 10, wherein said source of compressed fluid is engine bleed air from a turbojet engine.

12. The combination of claim 11, wherein the aircraft is an Over-the-Wing powered-lift aircraft.

13. The combination of claim 11, wherein the aircraft is an Upper Surface Blowing powered-lift aircraft.

14. The combination of claim 11, wherein the aircraft is an Externally Blown Flap, powered-lift aircraft.

15. The combination of claim 11, wherein the aircraft has a conventional mechanical non-powered high-lift system which generates sufficient upwash flow field to immerse the nacelles with a dynamic pressure component.

16. The combination of claim 8, wherein each of said at least one engine nacelle is provided with a fluid discharge slot on both the outboard and inboard sides of each of said at least one engine nacelle and said fluid flow selection means operates each fluid discharge slot differentially to produce pitch, roll, and yawing moments upon demand.

* * * * *